(12) United States Patent
Chen

(10) Patent No.: US 6,683,785 B1
(45) Date of Patent: Jan. 27, 2004

(54) MOBILE RACK FOR HARD DISK DRIVES

(75) Inventor: Shin-Hung Chen, Chung-Ho (TW)

(73) Assignee: Inromatics Incorporated, Taipei Hsien (TW)

( * ) Notice: Subject to any disclaimer, the term of this patent is extended or adjusted under 35 U.S.C. 154(b) by 0 days.

(21) Appl. No.: 10/234,222

(22) Filed: Sep. 4, 2002

(51) Int. Cl.$^7$ ................................ G06F 1/16
(52) U.S. Cl. ............... 361/685; 360/137; 312/332.1; 369/75.1
(58) Field of Search ................... 361/683, 685, 361/724–727; 360/98.01, 137, 137 B; 312/333, 332.1, 223.1, 223.2; 369/75.1–82

(56) References Cited

U.S. PATENT DOCUMENTS

| | | | | |
|---|---|---|---|---|
| 4,982,303 A | * | 1/1991 | Krenz | 360/137 |
| 5,483,419 A | * | 1/1996 | Kaczeus et al. | 361/685 |
| 6,067,225 A | * | 5/2000 | Reznikov et al. | 361/685 |
| 6,297,950 B1 | * | 10/2001 | Erwin | 361/685 |
| 6,359,778 B1 | * | 3/2002 | Wu | 361/685 |
| 6,381,130 B1 | * | 4/2002 | Yen | 361/685 |
| 6,606,256 B1 | * | 8/2003 | Lee et al. | 361/685 |

* cited by examiner

Primary Examiner—Lisa Lea-Edmonds
(74) Attorney, Agent, or Firm—Alan D. Kamrath; Rider Bennett, LLP

(57) ABSTRACT

A mobile rack for hard disk drive has a removable cartridge with guiding rails, a pull back spring, a pivot block, a mounting bracket, and a driver door held by a pivot block. The driver door is set in with two base blocks, wherein each block contains a slider, wherein each slider is attached to a sliding plate for fitting against the corresponding sliding rails in the base block. Each slider has a latching pin extending out from the lateral side of the driver door to lock in the mobile rack. The pair of sliders is used to release the latching pins from the mounting bracket. When the driver door is opened outward, tension applied on the pull back spring automatically forces out the removable cartridge from the mounting bracket to make it easier to remove the hard disk drive from the computer.

6 Claims, 7 Drawing Sheets

US 6,683,785 B1

MOBILE RACK FOR HARD DISK DRIVES

BACKGROUND OF THE INVENTION

1. Field of the Invention

The present invention relates to a mobile rack for a hard disk drive designed to facilitate the removal of a hard disk and the mobile rack from a computer.

2. Description of Related Arts

A hard disk is one of the most important data storage media for computers. Thanks to the advancement in hard disk technology, current hard disks allow a computer to store a massive amount of information in the secondary storage, which is readily accessible to the computer by the execution of program instructions. Mobile racks are created to enhance the portability of hard disks, so those users can store their important data in a hard disk and carry the disk with them wherever they go. Whenever they want to retrieve the data from the hard disk or save new data, they only need to find a computer with a mobile disk set up, and then insert the mobile rack holding the personal disk into the drive bay for data reading or writing. This is a convenient way for those people who need to use their personal disk but are a little hesitant to carry a bulky notebook along on a business trip. However, there is a precondition for such usage that is the user's mobile rack holding the personal disk has to be compatible with the particular mobile drive set up in the computer that is going to be used. If the dimensions of the mounting bracket on the computer are different from the new user's, then the new user has to dismount the hard disk from the mobile rack and switch it to the mobile rack installed on the computer.

It is not a very easy task to remove the hard disk from conventional mobile racks considering that the power connector and data cable are connected at the back of the hard disk. When one tries to remove the hard disk from the removable cartridge, one has to first push up the handle of the mobile rack before pulling out the cartridge from the mounting bracket, and then the hard disk has to be squeezed out from the sunken enclosure. The present invention is to provide a practical solution to the above problem by modifying the structure of the mobile rack.

SUMMARY OF THE INVENTION

The main objective of the present invention is to provide a mobile rack for hard disk drives, comprising a removable cartridge with a pair of guiding rails on the right and left side walls for fitting into the mounting bracket installed on the computer chassis, and a driver door held by a pivot block at one corner and in front of the removable cartridge. The driver door is set in with two base blocks, wherein each contains a slider with a cavity in the center, and each is attached to a sliding plate such that the top and bottom edges of the sliding plate ride on the corresponding sliding rails in the base block for engaging or releasing the latch of the mobile rack, which is a pair of latching pins extending out from each slider in an opposite direction beyond the lateral wall of the driver door through a pin hole. A pull back spring is wound on the pivot with one end hooked to the removable cartridge and the other end attached to the back of the driver door.

When removing the mobile rack holding the hard disk drive, one only has to push in the sliders housed in the driver door with two fingers, such that the latch of the driver door becomes released from the mounting bracket. As the driver door is opened outward, tension applied on the pull back spring will automatically force out the removable cartridge from the mounting bracket, so that user can easily remove the hard disk from the computer.

The features and structure of the present invention will be more clearly understood when taken in conjunction with the accompanying figures.

DETAILED DESCRIPTION OF THE PREFERRED EMBODIMENT

Figure 7:
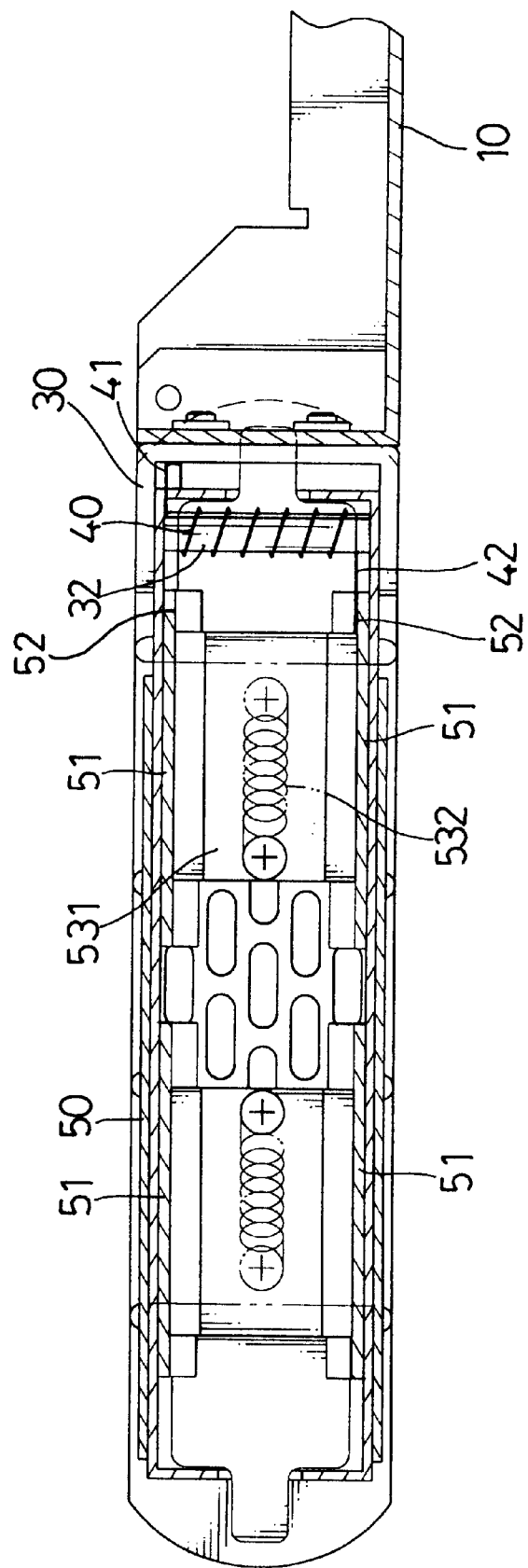
FIG. 7 is a cross-sectional view of the internal structure of the driver door from the lateral side, as a continuation from FIG. 6.

With reference to FIGS. 1, 2, 3, and 7, a removable cartridge in accordance with the present mainly comprises a removable cartridge (10) for holding a hard disk drive, a driver door (50) pivotally held by a pivot block (30) at one corner and in front of the removable cartridge (10), a mounting bracket (20) fixed on the computer chassis, and a pull back spring (40) mounted on a pivot (32) in the pivot block (30). The removable cartridge (10) has a guiding rail (11) installed on each sidewall of the cartridge (10) for sliding into the mounting bracket (20). The mounting bracket (20) has a pair of narrow front panels (23) mounted over two corners and on the front surface leaving a central opening for insertion of the removable cartridge (10), and has sliding guides (21) on the inner wall fitting against the corresponding guide rails (11) of the removable cartridge (10), and a pair of pin slots (22) on opposing inner wall for releasing or locking in the removable cartridge (10) and the driver door (50).The pivot block (30) has an upper block and lower block each having an axial hole (31) through which the pivot (32) is inserted, and the pivot block is in ⊏ shape when viewed from the lateral side. The pull back spring (40) has an upper grab hook (41) fixed to the inner edge of the pivot block (30) and a lower, grab hook (42) fixed to the back of the driver door (50). The driver door (50) as shown in FIG. 7 pivotally held by the pivot block (30) has two base blocks (51) each set in one half of the rectangular body of the pivoted assembly (50). Each base block (51) contains a slider (53) with cavity (54) in the center for accommodating a finger, and each slider (53) is attached to a sliding plate (531) which allows the slider (53) to slide along a sliding rail (52) on the top and bottom of the base block (51) for engaging or releasing a latch, which is a pair of latching pins (55) extending out from each slider (53) in opposite direction reaching out beyond the lateral wall of the driver door

(50) through a pin hole (56). Each sliding plate (531) has a spring (532) hooked between the sliding pin (531) and the back of the driver door (50), and the driver door (50) also has a pair of beveled openings (58) near the right and left sides of the face plate (57) corresponding to the position of a cavity (54) in the sliders (53) to facilitate the insertion of a user's fingers. The face plate (57) has air ventilation holes defined through a front face thereof.

Figure 1:
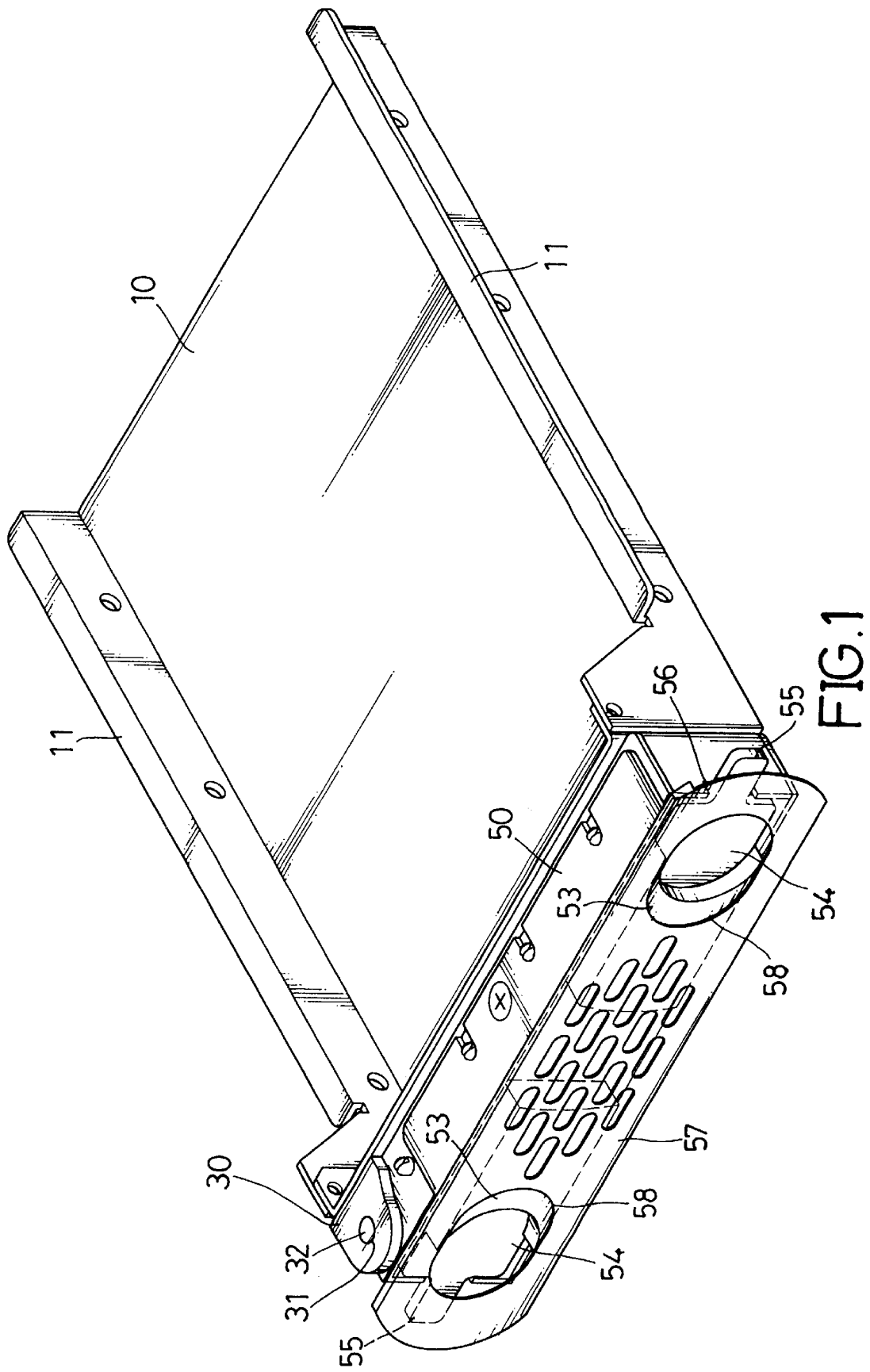
FIG. 1 is a perspective view of the mobile rack in accordance with the present invention.
Figure 2:
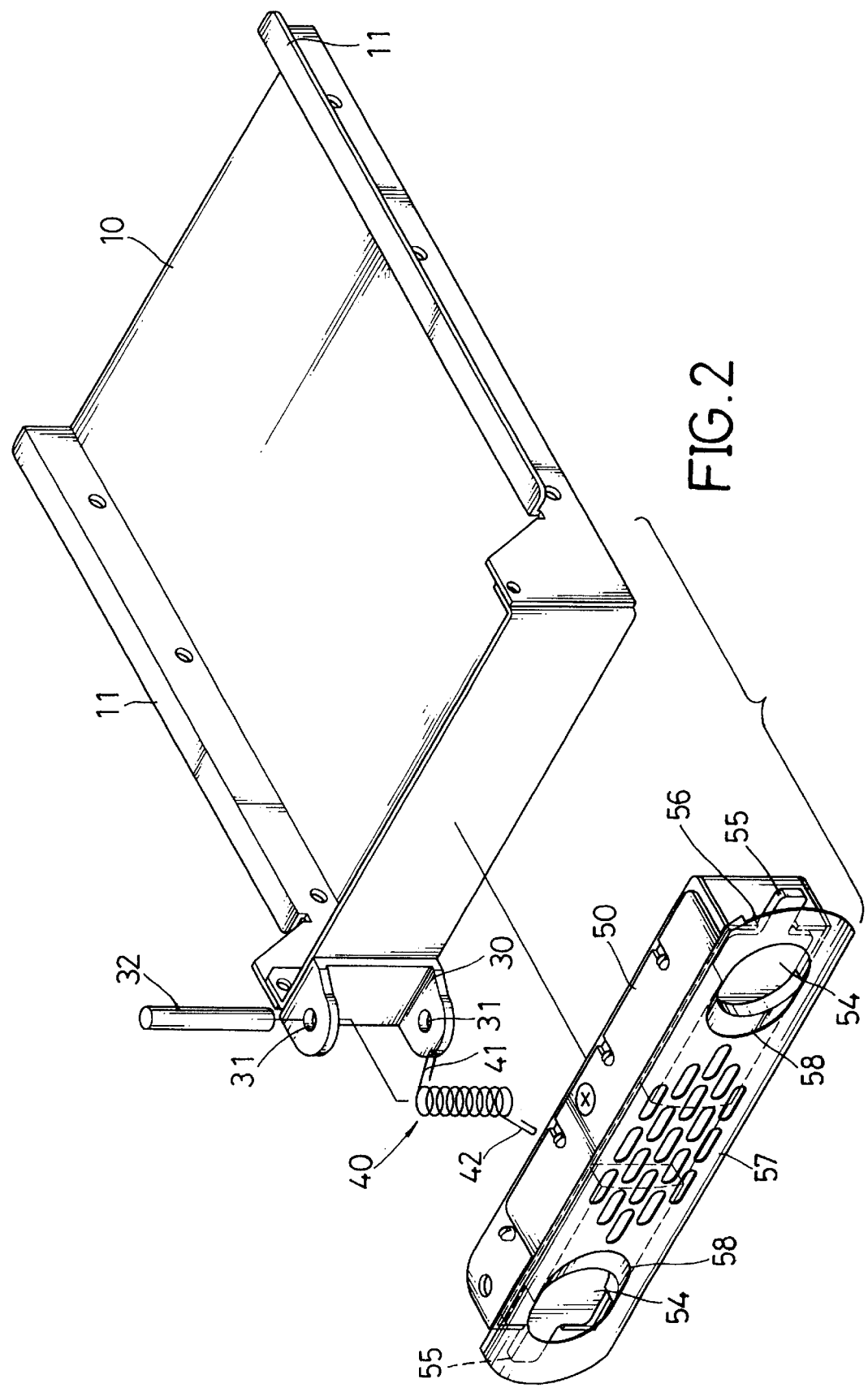
FIG. 2 is an exploded diagram of the mobile rack assembly showing the structure of the driver door in relation to the removable cartridge.
Figure 3:
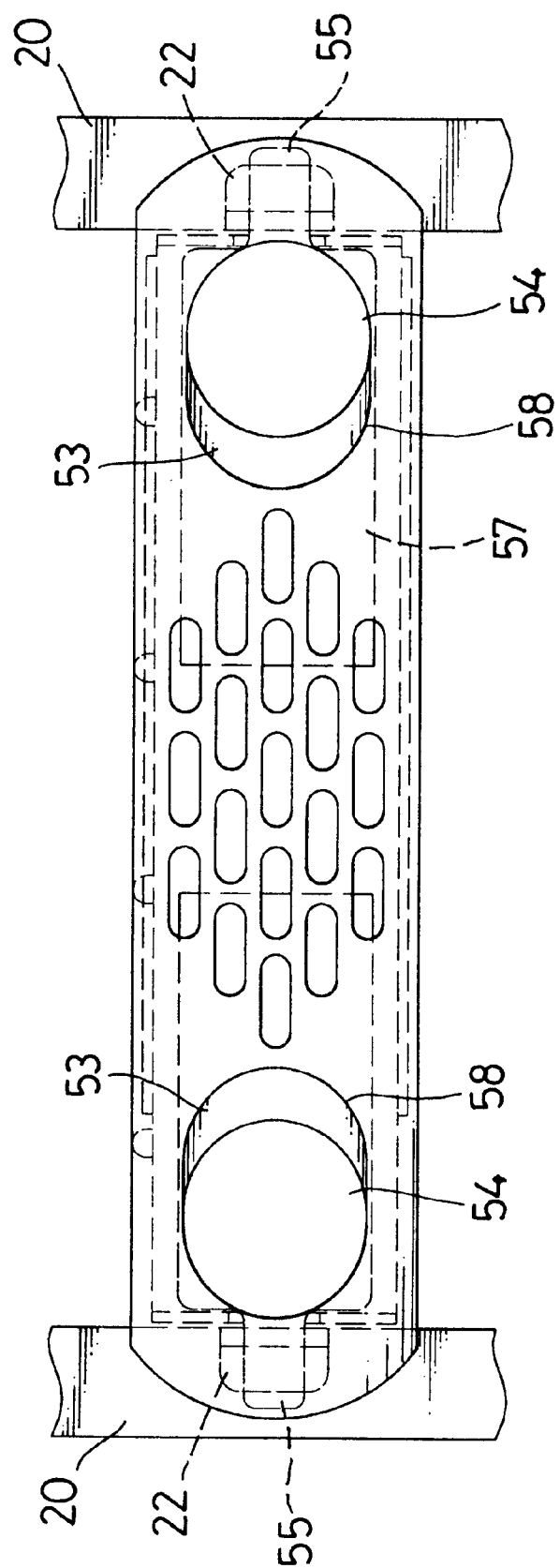
FIG. 3 is a front schematic diagram of a mobile rack installed for a preferred embodiment of the present invention.
Figure 4:
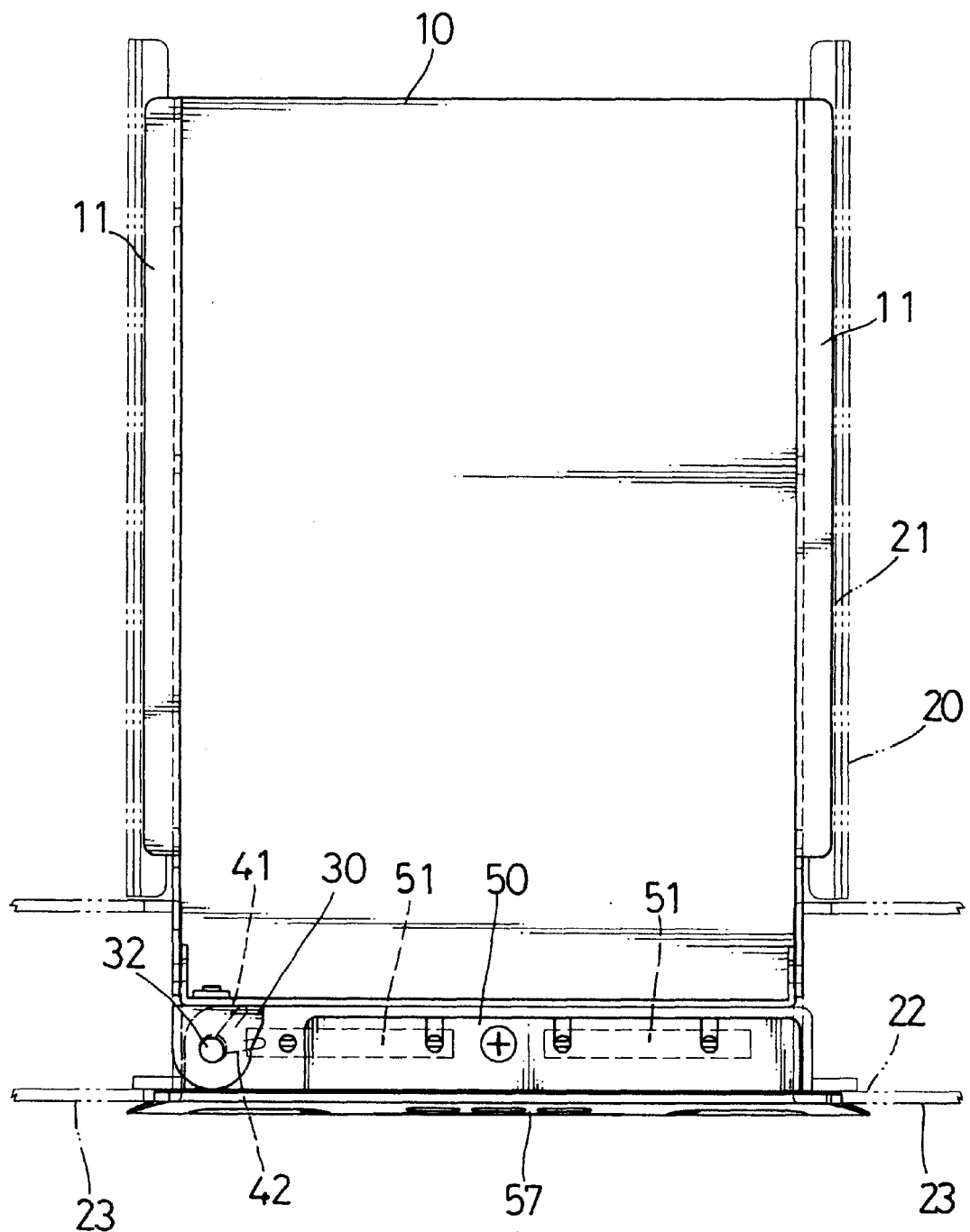
FIG. 4 is a top down schematic diagram of the mobile rack with a removable cartridge installed on the mounting bracket.

When the mobile rack is fully assembled as shown in FIGS. 1, 3 and 4, the removable cartridge (10) is mounted on the mounting bracket (20) inside the chassis, with the guiding rail (11) of the removable cartridge (10) properly aligned with the corresponding sliding rail (21) on the mounting bracket (20) for sliding into the mounting bracket (20). Then, by a user inserting two fingers to reach in the pair of beveled openings (58) on the face plate (57), the pair of sliders (53) are pushed in, allowing the pair of latching pins (55) to reset and engage in the pin slots (22) on the inner wall of the mounting bracket (20) for fixing the mobile rack in the drive bay.

Figure 5:
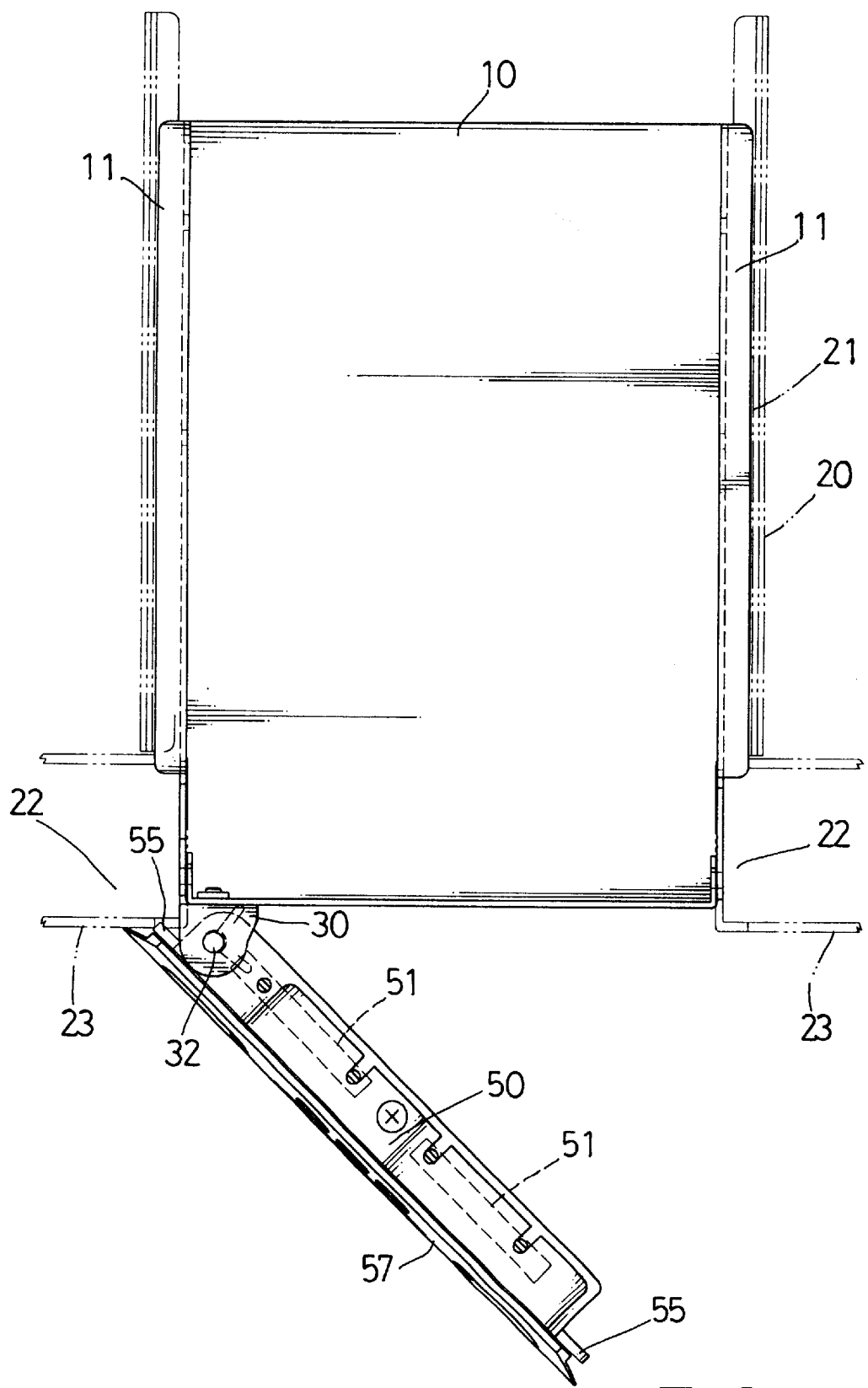
FIG. 5 is a top down schematic diagram of the mobile rack with the driver door half opened.
Figure 6:
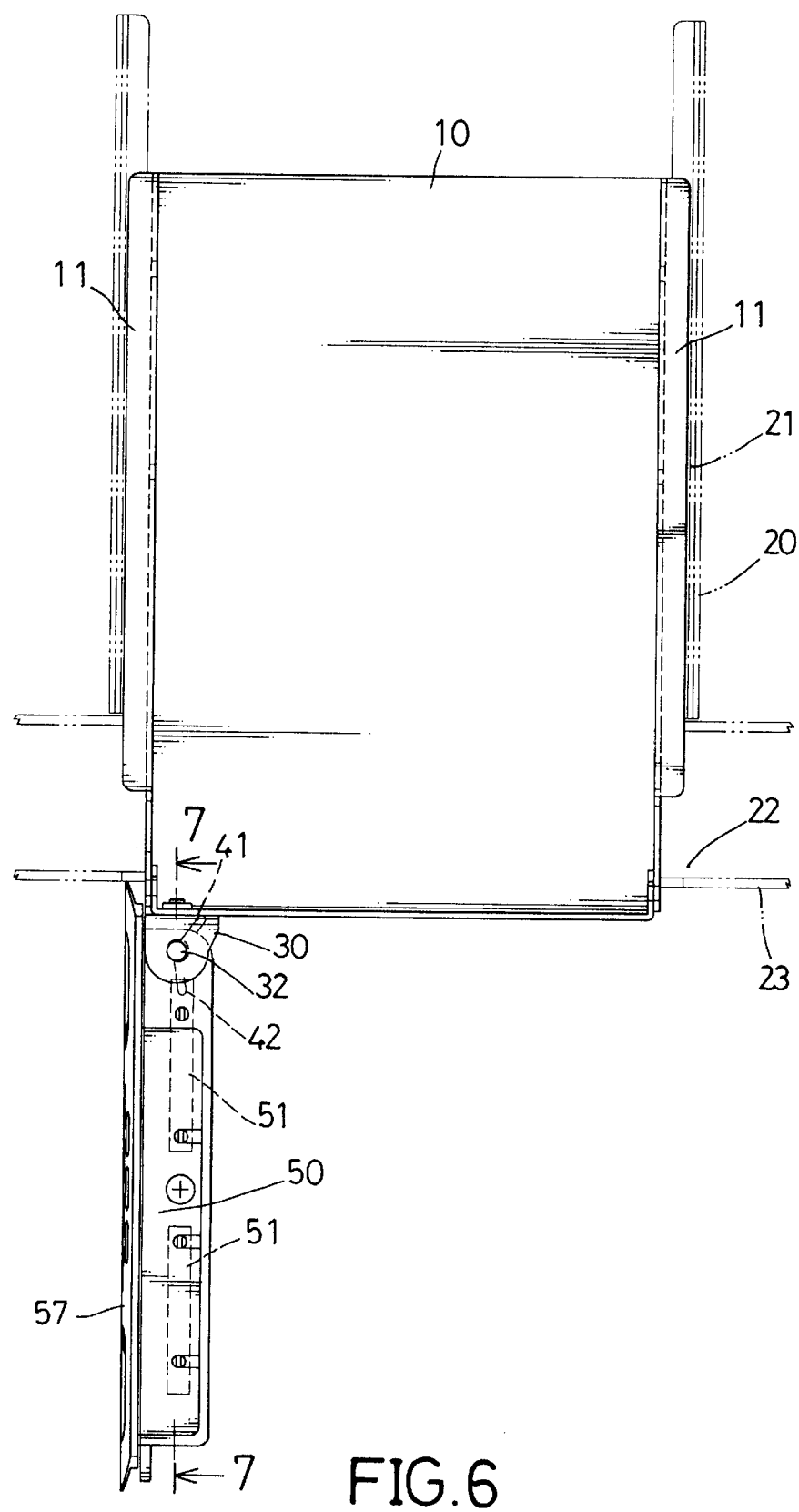
FIG. 6 is a top down schematic diagram of the mobile rack with the front-end fully opened showing the hard disk slightly pulled out from the removable cartridge.

When the hard disk drive with the removable cartridge (10) is to be removed from the mounting bracket (20), once again a user inserts two fingers to reach in the pair of beveled openings (58) on the face plate (57) to push in the pair of sliders (53), thus releasing the pair of latching pins (55) from the pin slots (22) on the inner wall of the mounting bracket (20). Since the upper grab hook (41) is fixed on the removable cartridge (10), and the lower grab hook (42) is fixed on the edge of the sliding rail (52) in the base block (51), when the driver door (50) is opened from one side, then the face plate (57) of the driver door (50) is nudged against the front panel (23) of the mounting bracket (20) (as shown in FIGS. 5, 6 and 7). Tension applied on the pull back spring (40) then automatically forces out the removable cartridge (10) holding the hard disk from the mounting bracket (20) for a certain length from the mounting bracket, thus making it easy to remove the hard disk from the computer.

The present design of the mobile rack possesses the advantages in that when a user wants to remove the hard disk, all that is needed is for a user to reach in the right and left sliders (53) in the driver door (50) with two fingers and push the sliders (53) inward, whereby the action of opening the driver door will automatically force out the removable cartridge (10) from the mounting bracket (20) for a certain length from the mounting bracket, so as to facilitate the removal of the hard disk from the computer.

The foregoing description of the preferred embodiments of the present invention is intended to be illustrative only and, under no circumstances, should the scope of the present invention be so restricted.

What is claimed is:

1. A mobile rack for removable hard disk drive comprising a removable cartridge for holding a hard disk drive, a driver door pivotally held by a pivot block at one corner and in front of the removable cartridge, a mounting bracket fixed on the computer chassis, and a pull back spring mounted on a pivot in the pivot block; wherein the removable cartridge has a pair of guiding rails on two side walls for holding the hard disk drive;

the pivot block has a center hole in the upper and lower blocks for holding the pivot;

the driver door is pivotally held by the pivot block on one end of the removable cartridge, wherein each side of the pivoted portion is set in with a base block equipped with sliding rails, and each base block contains a slider, wherein each slider has a cavity in the center and a sliding plate attached, such that upper and lower ends of the sliding plate are fitted against the corresponding sliding rails of the base block, and each sliding plate has a spring fixed between the sliding plate and the back of the driver door, and each slider has a latching pin extending laterally in opposite directions reaching beyond a lateral side of the driver door through a pin hole;

a face plate is mounted on a front of the driver door; and a pull back spring is mounted on the pivot held by the pivot block, such that an upper grab hook of the pull back spring is fixed on the pivot block, and a lower grab hook of the pull back spring is fixed at the back of the driver door.

2. The mobile rack for removable hard disk drive as claimed in claim 1, wherein the pivot block is in ⊏ shape.

3. The mobile rack for removable hard disk drive as claimed in claim 1, wherein an internal space of each slider of the base block forms a cavity.

4. The mobile rack for removable hard disk drive as claimed in claim 2, wherein an internal space of each slider of the base block forms a cavity.

5. The mobile rack for removable hard disk drive as claimed in claim 3, wherein two beveled openings are respectively defined in right and left corners of the faceplate corresponding to positions of the cavities in the sliders.

6. The mobile rack for removable hard disk drive as claimed in claim 3, wherein two beveled openings are respectively defined in right and left corners of the faceplate corresponding to positions of the cavities in the sliders.

\* \* \* \* \*